April 24, 1962 V. P. BROUGHTON 3,031,231
SKID MOUNTED DUMP UNIT FOR FLAT BED TRUCKS AND TRAILERS
Filed Nov. 25, 1960 3 Sheets-Sheet 1
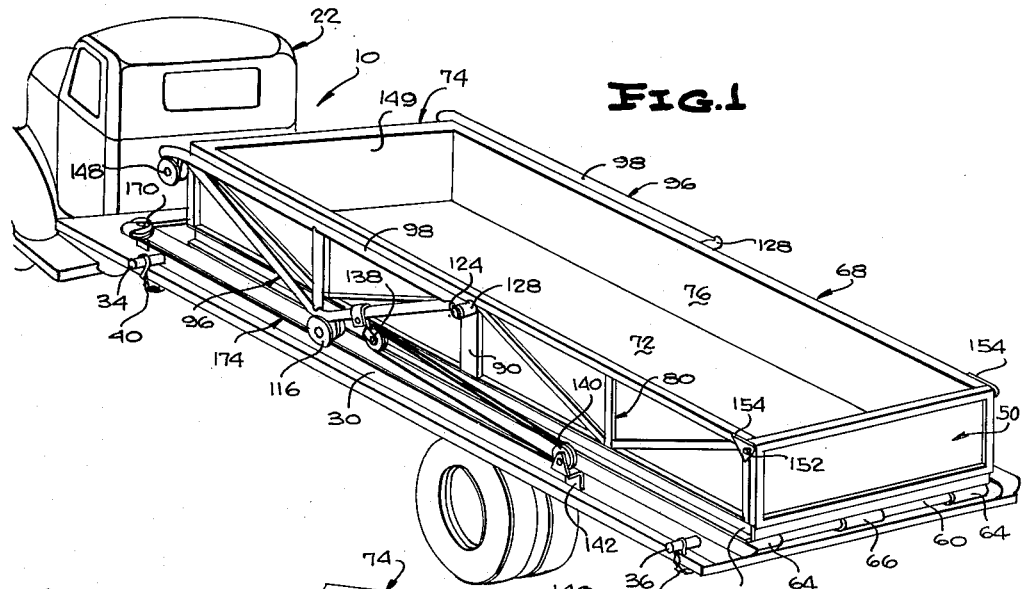
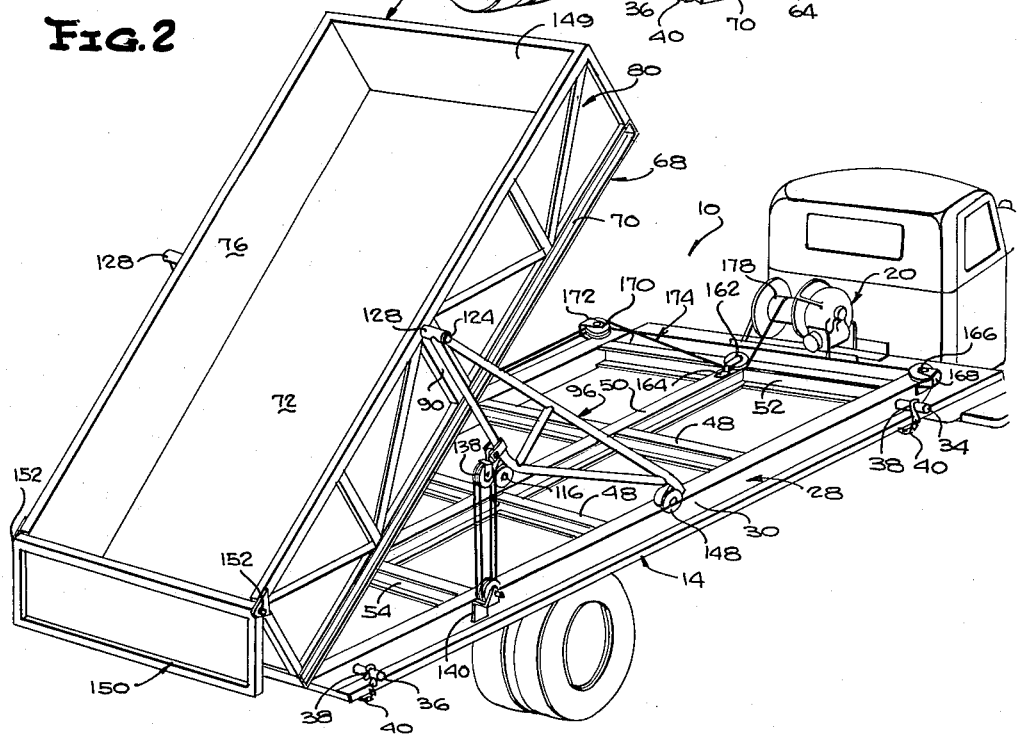
INVENTOR.
VERNON P. BROUGHTON
BY
McMorrow, Berman & Davidson
ATTORNEYS April 24, 1962 V. P. BROUGHTON 3,031,231
SKID MOUNTED DUMP UNIT FOR FLAT BED TRUCKS AND TRAILERS
Filed Nov. 25, 1960 3 Sheets-Sheet 2
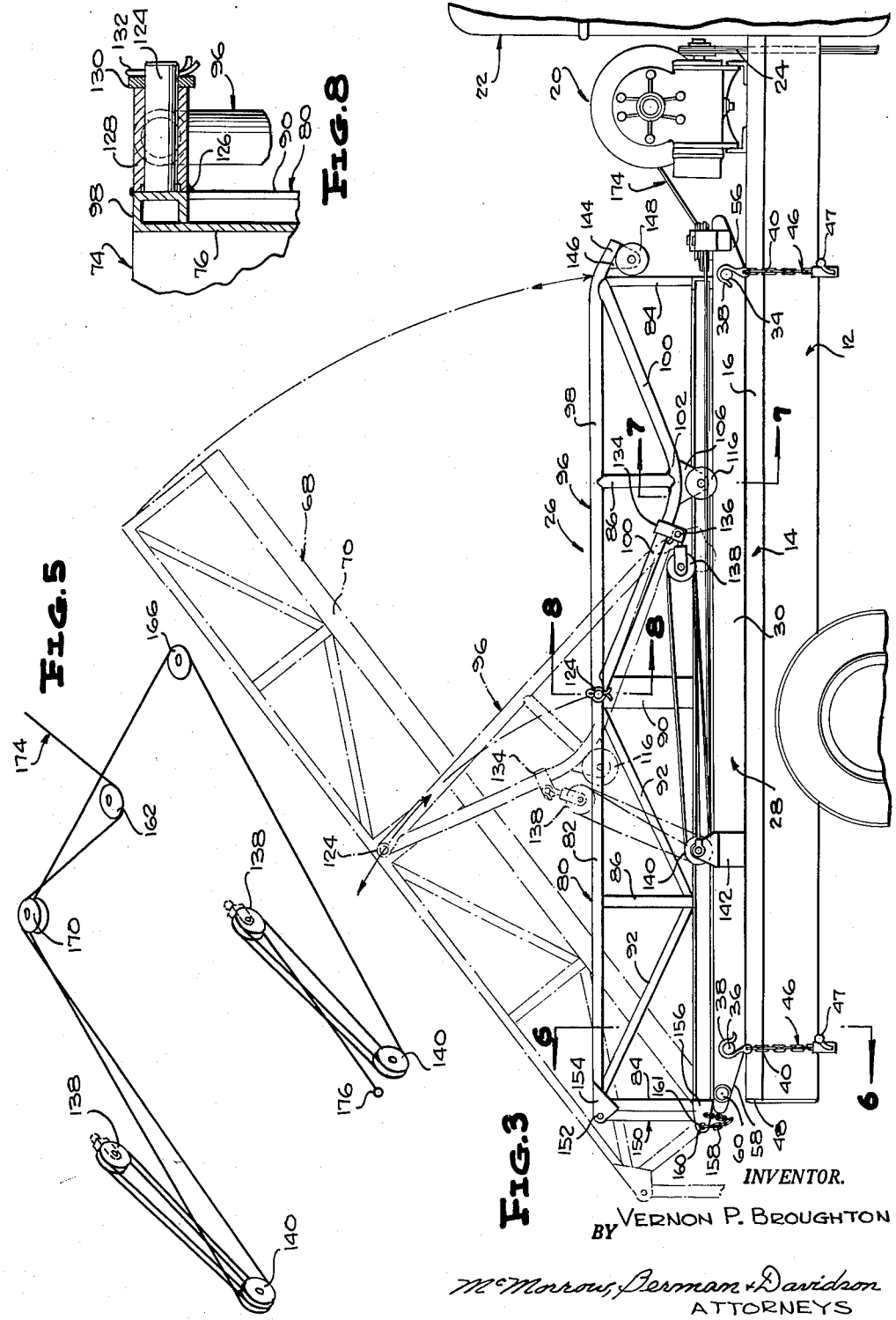
INVENTOR.
BY VERNON P. BROUGHTON
McMorrow, Berman & Davidson
ATTORNEYS April 24, 1962 V. P. BROUGHTON 3,031,231
SKID MOUNTED DUMP UNIT FOR FLAT BED TRUCKS AND TRAILERS
Filed Nov. 25, 1960 3 Sheets-Sheet 3
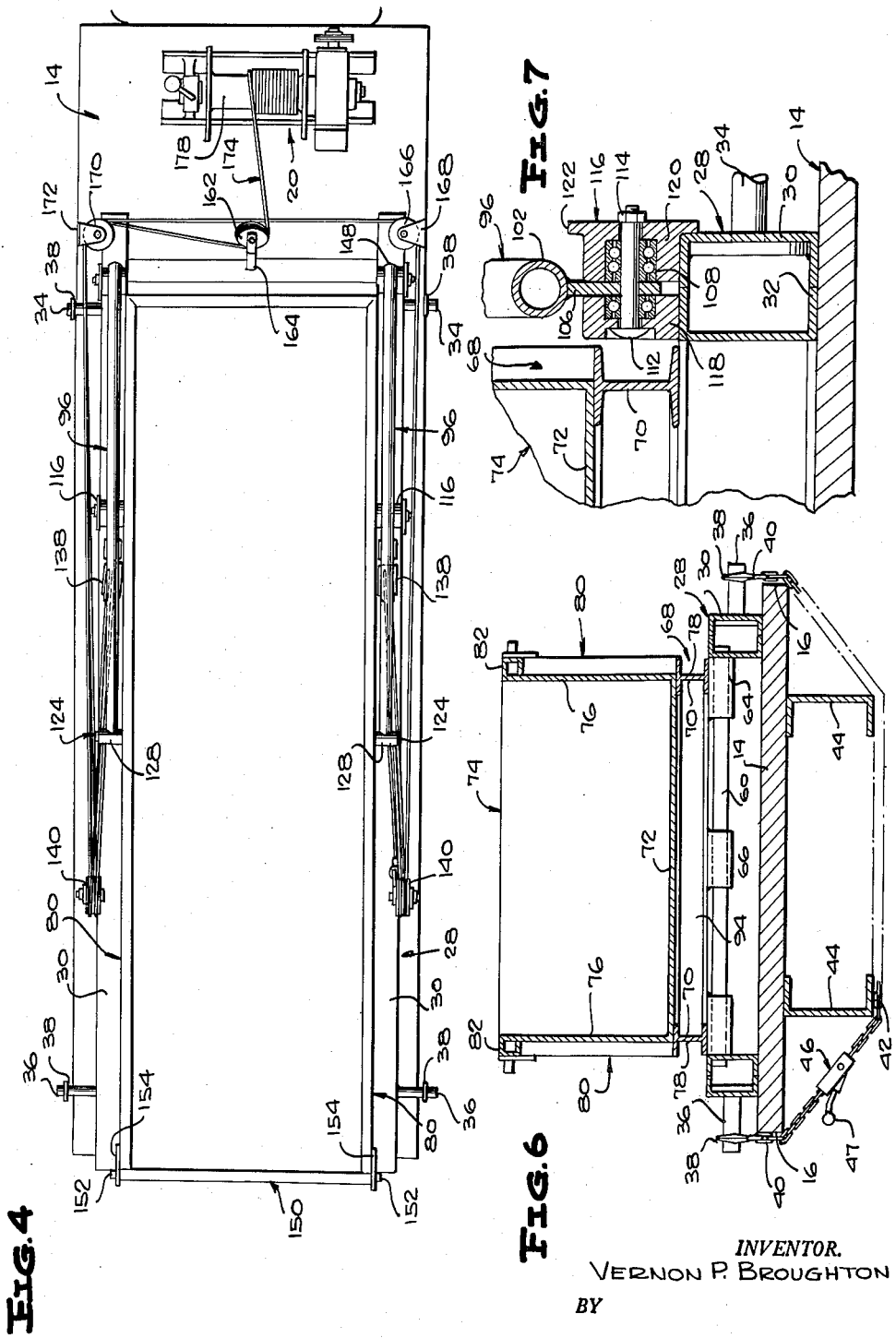
INVENTOR.
VERNON P. BROUGHTON
BY
McMorrow, Berman & Davidson
ATTORNEYS United States Patent Office 3,031,231
Patented Apr. 24, 1962

3,031,231
SKID MOUNTED DUMP UNIT FOR FLAT BED
TRUCKS AND TRAILERS
Vernon P. Broughton, Box 313, Sinton, Tex.
Filed Nov. 25, 1960, Ser. No. 71,724
12 Claims. (Cl. 298—17)

This invention relates to a novel dump unit for trucks.

The primary object of the invention is the provision of a simple, efficient dump unit, which is easily installed and removed, and which enables conversion of a flat bed truck to serve and operate as a dump truck.

Another object of the invention is the provision of a dump unit of the character indicated above, which involves a skid frame which is adapted to be skidded onto the flat bed of a truck and secured thereto, so as to serve as a base for the unit, a bed frame normally resting upon the skid frame and pivoted on the skid frame to swing upwardly and rearwardly thereon so as to dump cargo from a body structure fixed on the bed frame, walking beams pivoted at one end to the bed frame and support at other points by rollers bearing upon the skid frame, and operating means, driven by motor means on the truck, connected to the walking beams.

A further object of the invention is the provision of a dump unit of the character indicated above, wherein the operating means can be a novel arrangement of pulleys or sheaves, mounted on the walking beams and on the skid frame, and a single cable trained around the pulleys or sheaves, and a powered winch on the truck, such as an existent winch mounted on a forward part of the truck bed, around whose drum one end of the cable is wound and secured.

Other important objects and advantageous features of the invention will be apparent from the following description and the accompanying drawings, wherein, for purposes of illustration only, a specific form of the invention is set forth in detail.

In the drawings:

FIGURE 1 is a rear perspective view of a flat bed truck equipped with a dump unit of the present invention, the unit being in depressed position;

FIGURE 2 is a rear perspective view of the truck of FIGURE 1, showing the unit in an up-tilted, dumping position;

FIGURE 3 is a fragmentary right-hand side elevation of FIGURE 1, showing the dump unit in depressed position in full lines, and in up-tilted dumping position in phantom lines;

FIGURE 4 is a top plan view of FIGURE 3;

FIGURE 5 is a schematic diagram showing the disposition of the operating cable relative to the sheaves or pulleys;

FIGURE 6 is a vertical transverse section taken on lines 6—6 of FIGURE 3;

FIGURE 7 is an enlarged fragmentary vertical transverse section taken on the line 7—7 of FIGURE 3; and FIGURE 8 is a similarly enlarged fragmentary section taken on the line 8—8 of FIGURE 3.

Referring in detail to the drawings, wherein like numerals designate like parts throughout the several views, the numeral 10 generally designates a truck having a horizontal chassis 12 upon which is anchored a flat bed 14 having opposed longitudinal sides 16, and a rear end 18. A powered winch 20 is shown as being mounted upon the bed 14, immediately behind the cab 22 of the truck 10, and driven, as indicated at 24, by the engine (not shown) of the truck, but the winch can be at some other suitable location on the truck, and be self-powered, if desired.

A dump unit of the present invention generally designated 26, is shown as being shorter than the truck bed 14 but extends for the major part of the length of the bed 14, from the rear end of the bed. However, where the winch 20 is located elsewhere on the truck 10, and does not occupy the space required for it on the bed 14, the unit 26 can extend substantially the full length of the truck bed.

The dump unit 26 comprises a flat rectangular openwork skid frame 28, which, as clearly shown in FIGURE 6, is slightly narrower than the truck bed 14, and has parallel side members 30 which are preferably of box section. The lower walls 32 of the side members 30 are adapted to bear flatly upon the upper surface of the bed 14. At locations near the forward and rear ends of the side members 30 forward and rear horizontal fixed anchor rods 34 and 36, respectively, extend laterally outwardly from the side members, to be engaged by hooks 38 on the free ends of anchoring chains 40, whose other ends are fixed, as indicated at 42, in FIGURE 6, to the undersides of related side members 44 of the truck chassis 12. Incorporated in the anchoring chains 40 are suitable tightening means 46 which preferably have manual extending means 47, which, when reverse operated, serve to lengthen the chains 40 to enable disengaging the hooks 38 from the anchor rods 34 and 36. The foregoing anchoring arrangement holds the skid frame 28 down on the truck bed 14 and prevents lateral and longitudinal shifting of the skid frame on the truck bed, and enables quick and easy anchoring of and releasing of the unit 26, relative to the truck bed 14.

The skid frame 28 further comprises a suitable number of longitudinally spaced cross brace members 48, and a centered longitudinal brace member 50, which are connected together, at their intersections, the cross brace members 48 being fixed to the side members 30, and the longitudinal brace member 50 to the front and rear cross members 52 and 54, respectively, of the skid frame 28. As shown in FIGURE 3, the ends of the side members 30 are upwardly bevelled, as indicated at 56 and 58, respectively, so as to facilitate skidding the unit 26, on the ground or elsewhere, and onto and off of the truck bed 14.

A transverse trunnion shaft 60 extends between the skid frame side members 30, at their rear ends, and spaced journal sleeves supportably turn on the shaft 60, between the side members 30. As shown in FIGURE 6, these sleeves include end sleeves 64, whose outer ends bear against the inward sides of the side members 30, and a middle sleeve 66, the sleeves and the shaft 60 serving as the pivotal mounting for the bed frame 68 of the unit 26, which overlies the skid frame 28.

The bed frame 68 is narrower than the skid frame 28 and has parallel side members 70, preferably of I-beam form, which rest upon and are suitably fixed to the end sleeves 64. Suitably fixed upon the tops of the bed frame side members 70, and extending therebetween, is the bottom wall 72 of an elongated rectangular, open-top cargo body 74, having upstanding parallel side walls 76 which are preferably in vertical alignment with the webs 78 of the side members 70. Fixed to and rising from the tops of the side members 70 and extending along and fixed to the outer sides of the side walls 76, and extending the length thereof, are brace frames 80.

The brace frames 80 comprise upper horizontal channel bars 82, preferably parallel to the bed frame side members 70, end uprights 84, intermediate uprights 86, and a central upright 90. The central upright 90 is heavier and wider than the other uprights. All of the uprights are fixed, at related ends, to the side members 70 and the horizontal channel bars 82, which extend along the upper edges of the cargo body side walls 76. Extending between the uprights and the bars 82 and the side members 70 and fixed thereto, are diagonal brace bars 92. The sleeves 64 and 66 are fixed to the underside of a cross member 94 which extend, between and is fixed to the bed frame side members 70, at the rear ends thereof. The bed frame 68, and the cargo body 74, are slightly shorter than the skid frame 28, as shown in FIGURE 3, so that the forward ends of the bed frame and body are spaced rearwardly from the forward end of the skid frame 28.

Walking-beams 96, located at the outer sides of the bed frame 68, supply the leverage for elevating and tilting the bed frame 68, and provide support for controlling the subsiding of the bed frame to the skid frame 28. The walking-beams comprise inverted obtuse isosceles triangular rigid frames which are composed of straight upper longitudinal members 98, straight side members 100 which extend inwardly from the ends of the longitudinal member 98, at obtuse angles relative thereto, and meet in apices 102, and brace members 104 which are fixed, at related ends thereof, to the apices 102 and to the middle of the longitudinal member 98.

As shown in FIGURES 1, 2, 3 and 7, roller carrying plates 106 are fixed to and extend downwardly from the apices 102 of the walking-beams 96, and transverse roller shafts 108 extend therethrough, which have heads 112 on their inward ends, and nuts 114 threaded on their outward ends. Split rollers 116 are journalled on the shafts 108 which are composed of inner and outer ballbearing sections 118 and 120, respectively, of the same diameter, which are disposed at related sides of the plates 106. The outer roller sections 120 have annular flanges 122 on their outward ends. In the depressed position of the bed frame 68, the rollers 116 bear rollably upon the top walls of the skid frame side members 30, with the flanges 122 engaged with the outward sides of these side members.

As shown in detail in FIGURE 8, horizontal transverse pintles 124 are fixed, as indicated at 126, to the longitudinal upper members 98 of the walking-beams 96, in central vertical alignment with the central uprights 90 of the brace frames 80, and extend laterally outwardly therefrom, on which are journalled bearing sleeves 128 fixed on the rear ends of the walking-beams 96, at the intersections of the longitudinal members 98 and the rear side members 100, whereby the walking-beams are pivotally secured at their rear ends, to the bed frame 68, at midlength points which are spaced above the bed frame side members 70. The bearing sleeves 128 are removably secured on the pintles 124, as by means of washers 130 which are retained by such as cotter pins 132, extending through the pintles.

The walking-beams 96 further comprise sheave brackets 134 which embrace the rear walking-beam side members 100, at locations rear to the apices 102, and extending downwardly. Pivoted on the lower ends of the brackets 134, as indicated at 136, are pendant double sheaves 138. On the forward ends of the longitudinal members 98 are forwardly and downwardly angled extensions 144 which have downwardly extending roller carrying plates 146 thereon, on which are mounted forward rollers 148, similar to the intermediate rollers 116. The forward rollers 148 are arranged to bear upon and roll along the tops of the skid frame side members 30, where the walking-beams 96 are moved rearwardly and upwardly, as indicated in phantom lines in FIGURE 3, and in full lines in FIGURE 2, from their horizontal positions, shown in full lines in FIGURE 3, for elevating and tilting the bed frame 68 to its clamping position, wherein the intermediate rollers 116 are out of contact with the skid frame side members 30.

The cargo body 74 is preferably closed, at its forward end, by an upstanding end wall 149, but is open at its rear end. A tail gate 150 normally closes the open rear end of the body 74, and is pivoted, as indicated at 152, at the upper ends of its sides, on brackets 154 extended rearwardly from the channel bars 82 of the brace frame 80. Chain brackets 156 extend rearwardly from the rear ends of the bed frame side members 70 and carry chains 158 having pins 160 on their free ends which are adapted to be pushed through openings 161 in the brackets 156 to engage behind the lower part of the tail gate 148 to retain it in closed position.

On the outer sides of the side members 30 are fixed double sheaves 140, mounted on brackets 142, fixed to the outer sides of the side members 30, at locations to the rear of the pendant double sheaves 138.

Cable and winch means for operating the walking-beams 96 for elevating and depressing the bed frame 68 and the cargo body thereon, comprises besides the above described sheaves, stationary sheaves mounted on the skid frame 28 at the forward end thereof. The stationary sheaves include a single central sheave 162 mounted by a bracket 164 on the central brace member 50 of the skid frame 28, a single side sheave 166 mounted by a bracket 168 on the outward side of the right hand side member 30 of the skid frame, and a single double sheave 170 mounted by a bracket 172 on the outward side of the left-hand side member 30 of the skid frame. A single cable 174 is trained around the various sheaves, has one end thereof anchored to the skid frame 28, as indicated at 176, and has its other end wound around and suitably secured to the drum 178 of the winch 20.

As shown in FIGURE 5, the cable 174 passes from the winch drum 178 around the central single sheave 162, around the left-hand forward double sheave 170, to and around the rear double sheave 140, on the left-hand side of the skid frame 28, and twice around the pendant sheave 138 of the left-hand walking-beam 96. The cable passes forwardly from the left-hand rear sheave 140 and around the forward double sheave 170, to and around the right-hand forward single sheave 166. The cable then passes rearwardly to the right-hand rear fixed double sheave 140 and is trained therearound and around the pendant sheave 138 of the right-hand walking-beam 96, the cable being trained twice around and between the sheaves 138 and 140. From the right-hand walking-beam sheave 138 the cable extends rearwardly to an anchor 176 therefor on the skid frame 28.

In operation, the winch drum 178 being rotated in a direction to wind the cable 174 thereon, and the bed frame 68 being in its depressed position, bearing upon the skid frame 28, the portions of the cable extending between the fixed rear sheaves 140 and the walking-beam sheaves 138 are shortened, so that the walking-beams are pulled rearwardly with their intermediate rollers 116 rolling on the bed frame side members 30, and then pivots upwardly, so that the rollers 116 leave the side members 30 and the forward walking-beam rollers 148 reach and bear upon the side members 30 and roll rearwardly therealong. These rearward and upward movements of the walking-beams 96 push the bed frame 68 and the body 74 thereon upwardly and rearwardly on the axis of the trunnion shaft 60, to a rearwardly tilted dumping position, as shown in full lines in FIGURE 2 and in phantom lines in FIGURE 3, which position is held by stopping rotation of the winch drum 178.

The bed frame 68 and the body 74 are returned by gravity to their depressed positions on the skid frame, after a dumping operation, with the tail gate 150 open, by reversing the direction of rotation of the winch drum 178.

The herein described dump unit can also be mounted on and used on beds other than those of trucks and trailers, such as skid vehicles.

Although there have been shown and described herein preferred forms of the invention, it is to be understood that the invention is not necessarily confined thereto, and that any change or changes in the structure of and in the relative arrangement of components thereof are contemplated as being within the scope of the invention as defined by the claims appended hereto.

3,031,231

What is claimed is:

1. In combination, a truck having a chassis, a bed fixed upon the chassis and having sides and forward and rear ends, a horizontal skid frame removably resting upon said bed, means securing the skid frame in place, said skid frame having sides and forward and rear ends, a bed frame overlying and extending along said skid frame and bearing upon the skid frame in a depressed position, transverse axis pivot means pivoting the bed frame at its rear end to the skid frame at the rear end thereof, walking-beams at the sides of the bed frame, said walking-beams occupying horizontal positions in the depressed position of the bed frame, said walking-beams having forward and rear ends, means hinging the rear ends of the walking-beams to the bed frame at locations forward of said pivot means, intermediate rollers depending from the walking-beams at locations intermediate the ends of the walking-beams, forward rollers on and depending from the walking-beams at their forward ends, the intermediate rollers bearing upon the skid frame in the depressed position of the skid frame with the forward rollers out of contact with the skid frame, and operating means acting between the truck bed and the walking-beams for moving the walking-beams rearwardly and upwardly to put the forward rollers into rolling contact with the skid frame for tilting the bed frame upwardly and rearwardly relative to the skid frame to a tilted dumping position.

2. In combination, a truck having a chassis, a bed fixed upon the chassis and having sides and forward and rear ends, a horizontal skid frame removably resting upon said bed, means securing the skid frame in place, said skid frame having sides and forward and rear ends, a bed frame overlying and extending along said skid frame and bearing upon the skid frame in a depressed position, transverse axis pivot means pivoting the bed frame at its rear end to the skid frame at the rear end thereof, walking-beams at the sides of the bed frame, said walking-beams occupying horizontal positions in the depressed position of the bed frame, said walking-beams having forward and rear ends, means hinging the rear ends of the walking-means to the bed frame at locations forward of said pivot means, intermediate rollers depending from the walking-beams at locations intermediate the ends of the walking-beams, forward rollers on and depending from the walking-beams at their forward ends, the intermediate rollers bearing upon the skid frame in the depressed position of the skid frame with the forward rollers out of contact with the skid frame, and operating means acting between the truck bed and the walking-beams for moving the walking-beams rearwardly and upwardly to put the forward rollers into rolling contact with the skid frame for tilting the bed frame upwardly and rearwardly relative to the skid frame to a tilted dumping position, a cargo body fixed upon said bed frame and extending therealong, said body having an open rear end, and a pivoted tail gate normally closing said rear end.

3. In combination, a truck having a chassis, a bed fixed upon the chassis and having sides and forward and rear ends, a horizontal skid frame removably resting upon said bed, means securing the skid frame in place, said skid frame having sides and forward and rear ends, a bed frame overlying and extending along said skid frame and bearing upon the skid frame in a depressed position, transverse axis pivot means pivoting the bed frame at its rear end to the skid frame at the rear end thereof, walking-beams at the sides of the bed frame, said walking-beams occupying horizontal positions in the depressed position of the bed frame, said walking-beams having forward and rear ends, means hinging the rear ends of the walking-means to the bed frame at locations forward of said pivot means, intermediate rollers depending from the walking-beams at locations intermediate the ends of the walking-beams, forward rollers on and depending from the walking-beams at their forward ends, the intermediate rollers bearing upon the skid frame in the depressed position of the skid frame with the forward rollers out of contact with the skid frame, and operating means acting between the truck bed and the walking-beams for moving the walking-beams rearwardly and upwardly to put the forward rollers into rolling contact with the skid frame for tilting the bed frame upwardly and rearwardly relative to the skid frame to a tilted dumping position, a cargo body fixed upon said bed frame and extending therealong, said body having an open rear end, and a pivoted tail gate normally closing said rear end, fixed brace frames extending along the sides of the body above the bed frame, said brace frames having laterally outwardly extending pintles which are components of said hinging means.

4. In combination, a truck having a chassis, a bed fixed upon the chassis and having sides and forward and rear ends, a horizontal skid frame removably resting upon said bed, means securing the skid frame in place, said skid frame having sides and forward and rear ends, a bed frame overlying and extending along said skid frame and bearing upon the skid frame in a depressed position, transverse axis pivot means pivoting the bed frame at its rear end to the skid frame at the rear end thereof, walking-beams at the sides of the bed frame, said walking-beams occupying horizontal positions in the depressed position of the bed frame, said walking-beams having forward and rear ends, means hinging the rear ends of the walking-beams to the bed frame at locations forward of said pivot means, intermediate rollers depending from the walking-beams at locations intermediate the ends of the walking-beams, forward rollers on and depending from the walking-beams at their forward ends, the intermediate rollers bearing upon the skid frame in the depressed position of the skid frame with the forward rollers out of contact with the skid frame, and operating means acting between the truck bed and the walking-beams for moving the walking-beams rearwardly and upwardly to put the forward rollers into rolling contact with the skid frame for tilting the bed frame upwardly and rearwardly relative to the skid frame to a tilted dumping position, said securing means comprising laterally outwardly extending forward and rear anchor rods fixed on the sides of the skid frame at the forward and rear ends thereof, anchoring chains having free ends secured to the chassis beneath the bed, said chains having hooks thereon engaged over the anchor rods.

5. In combination, a truck having a chassis, a bed fixed upon the chassis and having sides and forward and rear ends, a horizontal skid frame removably resting upon said bed, means securing the skid frame in place, said skid frame having sides and forward and rear ends, a bed frame overlying and extending along said skid frame and bearing upon the skid frame in a depressed position, transverse axis pivot means pivoting the bed frame at its rear end to the skid frame at the rear end thereof, walking-beams at the sides of the bed frame, said walking-beams occupying horizontal positions in the depressed position of the bed frame, said walking-beams having forward and rear ends, means hinging the rear ends of the walking-beams to the bed frame at locations forward of said pivot means, intermediate rollers depending from the walking-beams at locations intermediate the ends of the walking beams, forward rollers on and depending from the walking-beams at their forward ends, the intermediate rollers bearing upon the skid frame in the depressed position of the skid frame with the forward rollers out of contact with the skid frame, and operating means acting between the truck bed and the walking-beams for moving the walking-beams rearwardly and upwardly to put the forward rollers into rolling contact with the skid frame for tilting the bed frame upwardly and rearwardly relative to the skid frame to a tilted dumping position, said securing means comprising laterally outwardly extending forward and rear anchor rods fixed on the sides of the skid frame at the forward and rear ends thereof, anchoring chains having free ends secured to the chassis beneath the bed, said chains having hooks thereon engaged over the anchor rods, said chains incorporating mechanical manually operated tighteners.

6. In combination, a truck having a chassis, a bed fixed upon the chassis and having sides and forward and rear ends, a horizontal skid frame removably resting upon said bed, means securing the skid frame in place, said skid frame having sides and forward and rear ends, a bed frame overlying and extending along said skid frame and bearing upon the skid frame in a depressed position, transverse axis pivot means pivoting the bed frame at its rear end to the skid frame at the rear end thereof, walking-beams at the sides of the bed frame, said walking-beams occupying horizontal positions in the depressed position of the bed frame, said walking-beams having forward and rear ends, means hinging the rear ends of the walking-beams to the bed frame at locations forward of said pivot means, intermediate rollers depending from the walking-beams at locations intermediate the ends of the walking-beams, forward rollers on and depending from the walking-beams at their forward ends, the intermediate rollers bearing upon the skid frame in the depressed position of the skid frame with the forward rollers out of contact with the skid frame, and operating means acting between the truck bed and the walking-beams for moving the walking-beams rearwardly and upwardly to put the forward rollers into rolling contact with the skid frame for tilting the bed frame upwardly and rearwardly relative to the skid frame to a tilted dumping position, said pivot means comprising a transverse trunnion shaft on the skid frame, bearing sleeves fixed on and depending from the bed frame and journalled on the trunnion shaft.

7. In combination, a truck having a chassis, a bed fixed upon the chassis and having sides and forward and rear ends, a horizontal skid frame removably resting upon said bed, means securing the skid frame in place, said skid frame having sides and forward and rear ends, a bed frame overlying and extending along said skid frame and bearing upon the skid frame in a depressed position, transverse axis pivot means pivoting the bed frame at its rear end to the skid frame at the rear end thereof, walking-beams at the sides of the bed frame, said walking-beams occupying horizontal positions in the depressed position of the bed frame, said walking-beams having forward and rear ends, means hinging the rear ends of the walking-beams to the bed frame at locations forward of said pivot means, intermediate rollers depending from the walking-beams at locations intermediate the ends of the walking-beams, forward rollers on and depending from the walking-beams at their forward ends, the intermediate rollers bearing upon the skid frame in the depressed position of the skid frame with the forward rollers out of contact with the skid frame, and operating means acting between the truck bed and the walking-beams for moving the walking-beams rearwardly and upwardly to put the forward rollers into rolling contact with the skid frame for tilting the bed frame upwardly and rearwardly relative to the skid frame to a tilted dumping position, said pivot means comprising a transverse trunnion shaft on the skid frame, bearing sleeves fixed on and depending from the bed frame and journalled on the trunnion shaft, said skid frame having side members between which shaft trunnion shaft extends, some of said sleeves being engaged with the inward sides of said side members.

8. In combination, a truck having a chassis, a bed fixed upon the chassis and having sides and forward and rear ends, a horizontal skid frame removably resting upon said bed, means securing the skid frame in place, said skid frame having sides and forward and rear ends, a bed frame overlying and extending along said skid frame and bearing upon the skid frame in a depressed position, transverse axis pivot means pivoting the bed frame at its rear end to the skid frame at the rear end thereof, walking-beams at the sides of the bed frame, said walking-beams occupying horizontal positions in the depressed positions of the bed frame, said walking-beams having forward and rear ends, means hinging the rear ends of the walking-beams to the bed frame at locations forward of said pivot means, intermediate rollers depending from the walking-beams at locations intermediate the ends of the walking-beams, forward rollers on and depending from the walking-beams at their forward ends, the intermediate rollers bearing upon the skid frame in the depressed position of the skid frame with the forward rollers out of contact with the skid frame, and operating means acting between the truck bed and the walking-beams for moving the walking-beams rearwardly and upwardly to put the forward rollers into rolling contact with the skid frame for tilting the bed frame upwardly and rearwardly relative to the skid frame to a tilted dumping position, said operating means comprising a powered winch having a drum, said winch being fixed on a forward part of the truck, a cable having a first end securably wound around said drum and a second end fixed to a rear part of the skid frame, sheaves mounted on said walking-beams, sheaves fixed on the sides of the skid frame behind the walking-beam sheaves, side sheaves mounted on a forward part of the skid frame at the sides thereof, and a central sheave mounted on the skid frame between the side sheaves, said cable having an intermediate portion trained around and between the walking-beam sheaves and the fixed sheaves and trained around and between the side sheaves and the central sheave.

9. In combination, a truck having a chassis, a bed fixed upon the chassis and having sides and forward and rear ends, a horizontal skid frame removably resting upon said bed, means securing the skid frame in place, said skid frame having sides and forward and rear ends, a bed frame overlying and extending along said skid frame and bearing upon the skid frame in a depressed position, transverse axis pivot means pivoting the bed frame at its rear end to the skid frame at the rear end thereof, walking-beams at the sides of the bed frame, said walking-beams occupying horizontal positions in the depressed position of the bed frame, said walking-beams having forward and rear ends, means hinging the rear ends of the walking-beams to the bed frame at locations forward of said pivot means, intermediate rollers depending from the walking-beams at locations intermediate the ends of the walking-beams, forward rollers on and depending from the walking-beams at their forward ends, the intermediate rollers bearing upon the skid frame in the depressed position of the skid frame with the forward rollers out of contact with the skid frame, and operating means acting between the truck bed and the walking-beams for moving the walking-beams rearwardly and upwardly to put the forward rollers into rolling contact with the skid frame for tilting the bed frame upwardly and rearwardly relative to the skid frame to a tilted dumping position, said operating means comprising a powered winch having a drum, said winch being fixed on a forward part of the truck, a cable having a first end securably wound around said drum and a second end fixed to a rear part of the skid frame, sheaves mounted on said walking-beams, sheaves fixed on the sides of the skid frame behind the walking-beam sheaves, side sheaves mounted on a forward part of the skid frame at the sides thereof, and a central sheave mounted on the skid frame between the side sheaves, said cable having an intermediate portion trained around and between the walking-beam sheaves and the fixed sheaves and trained around and between the side sheaves and the central sheave, said cable being a single cable and said intermediate portion of the cable having a part leading from said central sheave to the winch drum.

10. In combination, a truck having a chassis, a bed fixed upon the chassis and having sides and forward and rear ends, a horizontal skid frame removably resting upon said bed, means securing the skid frame in place, said skid frame having sides and forward and rear ends, a bed frame overlying and extending along said skid frame and bearing upon the skid frame in a depressed position, transverse axis pivot means pivoting the bed frame at its rear end to the skid frame at the rear end thereof, walking-beams at the sides of the bed frame, said walking-beams occupying horizontal positions in the depressed position of the bed frame, said walking-beams having forward and rear ends, means hinging the rear ends of the walking-beams to the bed frame at locations forward of said pivot means, intermediate rollers depending from the walking-beams at locations intermediate the ends of the walking-beams and forward rollers at their forward ends, the intermediate rollers bearing upon the skid frame in the depressed position of the skid frame with the forward rollers out of contact with the skid frame, and operating means acting between the truck bed and the walking-beams for moving the walking-beams rearwardly and upwardly to put the forward rollers into rolling contact with the skid frame for tilting the bed frame upwardly and rearwardly relative to the skid frame to a tilted dumping position, said skid frame being shorter than said bed with its forward end spaced rearwardly from the forward end of the bed, and power means mounted on the bed in front of the skid frame and connected to said operating means.

11. In combination, a truck having a chassis, a bed fixed upon the chassis and having sides and forward and rear ends, a horizontal skid frame removably resting upon said bed, means securing the skid frame in place, said skid frame having sides and forward and rear ends, a bed frame overlying and extending along said skid frame and bearing upon the skid frame in a depressed position, transverse axis pivot means pivoting the bed frame at its rear end to the skid frame at the rear end thereof, walking-beams at the sides of the bed frame, said walking-beams occupying horizontal positions in the depressed position of the bed frame, said walking-beams having forward and rear ends, means hinging the rear ends of the walking-beams to the bed frame at locations forward of said pivot means, intermediate rollers depending from the walking-beams at locations intermediate the ends of the walking-beams, forward rollers on and depending from the walking-beams at their forward ends, the intermediate rollers bearing upon the skid frame in the depressed position of the skid frame with the forward rollers out of contact with the skid frame, and operating means acting between the truck bed and the walking-beams for moving the walking-beams rearwardly and upwardly to put the forward rollers into rolling contact with the skid frame for tilting the bed frame upwardly and rearwardly relative to the skid frame to a tilted dumping position, a cargo body fixed upon said bed frame and extending therealong, said body having an open rear end, and a pivoted tail gate normally closing said rear end, said bed frame and said cargo body being coextensive and of the same length.

12. In combination, a truck having a chassis, a bed fixed upon the chassis and having sides and forward and rear ends, a horizontal skid frame removably resting upon said bed, means securing the skid frame in place, said skid frame having sides and forward and rear ends, a bed frame overlying and extending along said skid frame and bearing upon the skid frame in a depressed position, transverse axis pivot means pivoting the bed frame at its rear end to the skid frame at the rear end thereof, walking-beams at the sides of the bed frame, said walking-beams occupying horizontal positions in the depressed position of the bed frame, said walking-beams having forward and rear ends, means hinging the rear ends of the walking-beams to the bed frame at locations forward of said pivot means, intermediate rollers depending from the walking-beams at locations intermediate the ends of the walking-beams, forward rollers on and depending from the walking-beam at their forward ends, the intermediate rollers bearing upon the skid frame in the depressed position of the skid frame with the forward rollers out of contact with the skid frame, and operating means acting between the truck bed and the walking-beams for moving the walking-beams rearwardly and upwardly to put the forward rollers into rolling contact with the skid frame for tilting the bed frame upwardly and rearwardly relative to the skid frame to a tilted dumping position, a cargo body fixed upon said bed frame and extending therealong, said body having an open rear end, and a pivoted tail gate normally closing said rear end, said bed frame and said cargo body being coextensive and of the same length, the bed frame being narrower than the said frame.

References Cited in the file of this patent

UNITED STATES PATENTS

| | | |
|---|---|---|
| 1,883,472 | Barrett | Oct. 18, 1932 |
| 2,534,156 | Wyatt et al. | Dec. 12, 1950 |
| 2,694,599 | Porter et al. | Nov. 16, 1954 |
| 2,963,186 | Beck et al. | Dec. 6, 1960 |